US011235203B2

(12) United States Patent
Horiuchi et al.

(10) Patent No.: US 11,235,203 B2
(45) Date of Patent: *Feb. 1, 2022

(54) GOLF BALL

(71) Applicant: SUMITOMO RUBBER INDUSTRIES, LTD., Kobe (JP)

(72) Inventors: Kuniyasu Horiuchi, Kobe (JP); Toshiyuki Tarao, Kobe (JP); Kazuya Kamino, Kobe (JP); Hidetaka Inoue, Kobe (JP)

(73) Assignee: SUMITOMO RUBBER INDUSTRIES, LTD., Kobe (JP)

(*) Notice: Subject to any disclaimer, the term of this patent is extended or adjusted under 35 U.S.C. 154(b) by 64 days.

This patent is subject to a terminal disclaimer.

(21) Appl. No.: 16/818,653

(22) Filed: Mar. 13, 2020

(65) Prior Publication Data

US 2020/0306592 A1 Oct. 1, 2020

(30) Foreign Application Priority Data

Mar. 27, 2019 (JP) .............................. JP2019-060595
Oct. 21, 2019 (JP) .............................. JP2019-192019

(51) Int. Cl.
| | | |
|---|---|---|
| *A63B 37/00* | (2006.01) | |
| *C09D 175/06* | (2006.01) | |
| *C08K 3/36* | (2006.01) | |
| *C09D 175/04* | (2006.01) | |
| *C08G 18/64* | (2006.01) | |
| *C08G 18/73* | (2006.01) | |
| *C08G 18/75* | (2006.01) | |
| *C08G 18/42* | (2006.01) | |
| *C08G 18/62* | (2006.01) | |
| *C08G 18/40* | (2006.01) | |
| *C08G 18/78* | (2006.01) | |
| *C08K 3/34* | (2006.01) | |

(52) U.S. Cl.
CPC .... *A63B 37/0022* (2013.01); *A63B 37/00221* (2020.08); *A63B 37/00222* (2020.08); *C08G 18/4081* (2013.01); *C08G 18/4277* (2013.01); *C08G 18/6275* (2013.01); *C08G 18/6484* (2013.01); *C08G 18/73* (2013.01); *C08G 18/755* (2013.01); *C08G 18/7831* (2013.01); *C09D 175/04* (2013.01); *C09D 175/06* (2013.01); *A63B 37/0096* (2013.01); *C08K 3/346* (2013.01); *C08K 2201/005* (2013.01)

(58) Field of Classification Search
None
See application file for complete search history.

(56) References Cited

U.S. PATENT DOCUMENTS

| | | | | |
|---|---|---|---|---|
| 10,723,911 | B2* | 7/2020 | Kamino | C08G 18/6677 |
| 2006/0030428 | A1* | 2/2006 | Ohira | C09D 175/06 |
| | | | | 473/378 |
| 2009/0197706 | A1 | 8/2009 | Yamada et al. | |
| 2011/0224024 | A1 | 9/2011 | Tutmark | |
| 2013/0165271 | A1 | 6/2013 | Lee | |
| 2015/0258705 | A1* | 9/2015 | Hirata | B33Y 30/00 |
| | | | | 428/210 |
| 2017/0056731 | A1* | 3/2017 | Tarao | A63B 37/0089 |
| 2018/0093137 | A1* | 4/2018 | Park | C08G 18/4252 |
| 2020/0038712 | A1* | 2/2020 | Kamino | C09D 175/08 |
| 2020/0306593 | A1* | 10/2020 | Horiuchi | A63B 37/0047 |
| 2020/0308441 | A1* | 10/2020 | Kamino | C09D 175/08 |

FOREIGN PATENT DOCUMENTS

| | | |
|---|---|---|
| EP | 3603754 A2 | 2/2020 |
| EP | 3603755 A1 | 2/2020 |
| JP | 2001-214131 A | 8/2001 |
| JP | 2013-521870 A | 6/2013 |
| JP | 2015-503400 A | 2/2015 |

OTHER PUBLICATIONS

Nipsil Precipitated Silica; Tosoh Silica Corporation; 2019 pp. 1-16. (Year: 2019).*
Extended European Search Report for European Application No. 20165469.6, dated Sep. 9, 2020.

* cited by examiner

*Primary Examiner* — David J Buttner
(74) *Attorney, Agent, or Firm* — Birch, Stewart, Kolasch & Birch, LLP

(57) ABSTRACT

An object of the present invention is to provide a golf ball having excellent spin performance on approach shots under a wet condition and excellent spin performance on approach shots under a condition that there is grass between the golf ball and the club face. The present invention provides a golf ball comprising a golf ball body and a paint film composed of at least one layer and formed on a surface of the golf ball body, wherein an outermost layer of the paint film located at the outermost layer of the golf ball contains a base resin and a porous filler, the base resin contains a polyurethane obtained by a reaction between a polyisocyanate composition and a polyol composition, and the porous filler contains $SiO_2$ in an amount of 50 mass % or more as a constituent component.

20 Claims, 3 Drawing Sheets

GOLF BALL

FIELD OF THE INVENTION

The present invention relates to a golf ball comprising a paint film.

DESCRIPTION OF THE RELATED ART

Conventionally, a golf ball has a paint film formed on a surface of a golf ball body. The paint film contributes to the performance, quality, appearance and the like of the golf ball. Regarding the performance of the golf ball of them, the paint film is considered to mainly contribute to the performance on a weak shot such as an approach shot because the paint film is generally very thin in the thickness thereof.

It has been investigated to improve the performance of the golf ball by changing the composition of the paint film. For example, JP 2015-503400 A discloses a golf ball comprising a core and a cover substantially surrounding the core, wherein the cover includes at least one dimple and at least one land area adjacent to the at least one dimple, a portion of the surface of the golf ball is hydrophobic, and a portion of the surface of the golf ball is hydrophilic.

JP 2013-521870 A discloses a golf ball comprising a golf ball body having an outer surface including a plurality of dimples formed thereon; and a protective coating applied to the outer surface of the golf ball body and containing a hydrophobic thermoplastic polyurethane. In addition, JP 2001-214131 A discloses a golf ball clear paint containing an organic silicon compound.

SUMMARY OF THE INVENTION

However, the prior golf balls do not necessarily have satisfactory spin performance on approach shots, and there is still room for improvement in the spin performance on approach shots under a wet condition. In addition, in the prior arts, the spin performance on approach shots under a condition that there is grass between the golf ball and the club face was not investigated.

The present invention has been made in view of the abovementioned circumstances, and an object of the present invention is to provide a golf ball having excellent spin performance on approach shots under a wet condition and excellent spin performance on approach shots under a condition that there is grass between the golf ball and the dub face.

The present invention that has solved the above problem provides a golf ball comprising a golf ball body and a paint film composed of at least one layer and formed on a surface of the golf ball body, wherein an outermost layer of the paint film located at the outermost layer of the golf ball contains a base resin and a porous filler, the base resin contains a polyurethane obtained by a reaction between a polyisocyanate composition and a polyol composition, and the porous filler contains $SiO_2$ in an amount of 50 mass % or more as a constituent component.

According to the present invention, a golf ball having excellent spin performance on approach shots under a wet condition and excellent spin performance on approach shots under a condition that there is grass between the golf ball and the club face is obtained.

DESCRIPTION OF THE PREFERRED EMBODIMENT

Figure 1:
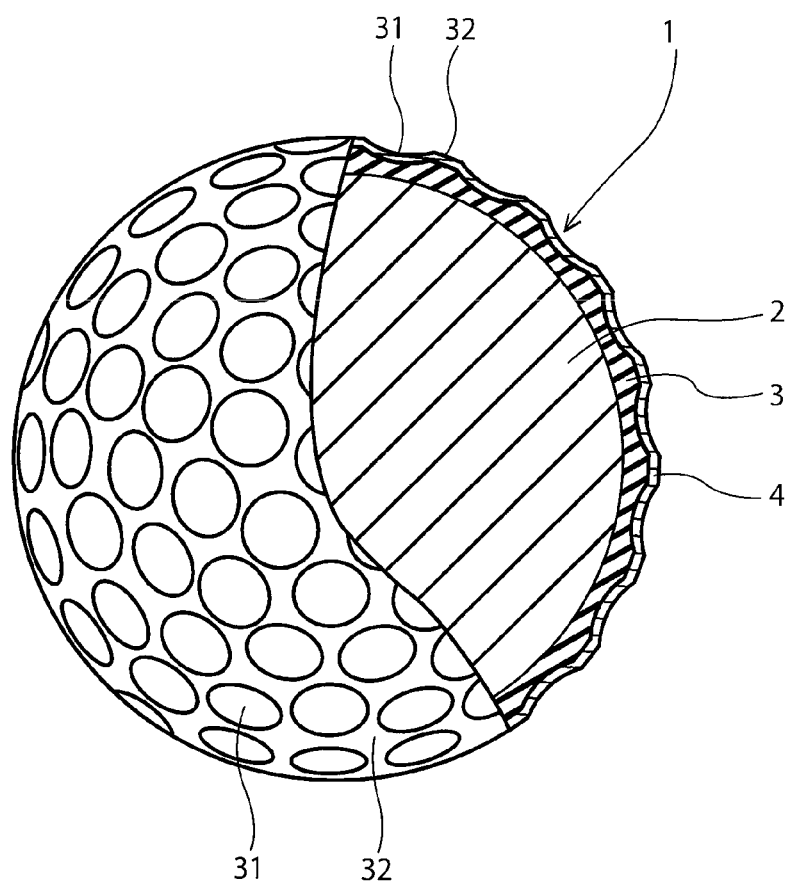
FIG. 1 is a partially cutaway cross-sectional view of a golf ball according to one embodiment of the present invention.

The present invention provides a golf ball comprising a golf ball body and a paint film composed of at least one layer and formed on a surface of the golf ball body, wherein an outermost layer of the paint film located at the outermost layer of the golf ball contains a base resin and a porous filler, the base resin contains a polyurethane obtained by a reaction between a polyisocyanate composition and a polyol composition, and the porous filler contains $SiO_2$ in an amount of 50 mass % or more as a constituent component.

(Porous Filler)

First, the porous filler contained in the outermost layer of the paint film of the golf ball according to the present invention will be explained. The porous filler has many fine pores. The shape of the fine pore included in the porous filler is not particularly limited. The pore size of the fine pore included in the porous filler is not particularly limited, but the pore size of the fine pore preferably ranges from 0.1 nm to 500 nm. The pore size of the fine pore included in the porous filler varies depending on the type of the porous filler. For example, zeolite has a pore size in a range from 0.1 nm to 2 nm, and diatomaceous earth has a pore size of about 300 nm.

The porous filler contains $SiO_2$ in an amount of 50 mass % or more as a constituent component. If the amount of $SiO_2$ in the porous filler is 50 mass % or more, the paint film has improved water repellency, and thus the spin performance on the shot in a state wetted with water is improved. The amount of $SiO_2$ in the constituent component of the porous filler is preferably 55 mass % or more, more preferably 60 mass % or more, and is 100 mass % or less, preferably 95 mass % or less, more preferably 90 mass % or less. It is noted that the amount of $SiO_2$ was determined by quantifying the amount of Si element by fluorescence X-ray analysis and converting the amount of Si element into the amount of $SiO_2$ component.

Examples of the porous filler include diatomaceous earth, zeolite and perlite. Diatom is a kind of plankton, and dead bodies of diatom deposited on seabed or lake bed, and fossilized into Diatomaceous earth. Diatomaceous earth primarily contains silica, and has many very fine structures in each particle thereof. Perlite is a porous material formed when water included in a glassy volcanic stone such as obsidian, pearlstone and pitchstone is evaporated by treating the glassy volcanic stone at a high temperature. Zeolite is a crystalline porous alumino-silicate. Examples of the structure of zeolite include type A, ferrierite, ZSM-5, mordenite, beta, type X and type Y. It is noted that zeolite also includes porous silicalite. The porous filler may be used solely, or two or more of them may be used in combination.

The volume average particle size of the porous filler is preferably 0.5 μm or more, more preferably 1.0 μm or more, and even more preferably 2.0 μm or more, and is preferably 30 μm or less, more preferably 20 μm or less, and even more preferably 15 μm or less. If the volume average particle size of the porous filler is 0.5 μm or more, the water-discharging effect is better and the spin performance under a wet condition is further enhanced, and if the volume average particle size of the porous filler is 30 μm or less, the appearance is better and the stain attachment can be decreased.

The bulk density of the porous filler is not particularly limited, but it is preferably 0.2 g/cm$^3$ or more, more preferably 0.3 g/cm$^3$ or more, and is preferably 1.0 g/cm$^3$ or less, more preferably 0.9 g/cm$^3$ or less, and even more preferably 0.8 g/cm$^3$ or less.

The amount of the porous filler in the outermost layer of the paint film is preferably 3 parts by mass or more, more preferably 5 parts by mass or more, and even more preferably 8 parts by mass or more, and is preferably 200 parts by mass or less, more preferably 150 parts by mass or less, and even more preferably 120 parts by mass or less, with respect to 100 parts by mass of the base resin of the outermost layer of the paint film. If the amount of the porous filler is 3 parts by mass or more, the water-discharging effect is better and the spin performance under a wet condition is further enhanced, and if the amount of the porous filler is 200 parts by mass or less, the appearance is better and the stain attachment is reduced.

(Polyurethane)

The base resin of the outermost layer of the paint film of the golf ball according to the present invention contains a polyurethane obtained by a reaction between a polyisocyanate composition and a polyol composition. The outermost layer of the paint film is preferably formed from a paint containing the polyol composition and the polyisocyanate composition. Examples of the paint include a so-called two-component curing urethane paint having the polyol composition as a base material and the polyisocyanate composition as a curing agent.

(Polyol Composition)

The polyol composition contains a polyol compound. Examples of the polyol compound include a compound having two or more hydroxyl groups in one molecule. Examples of the polyol compound include a compound having a hydroxyl group at a terminal of the molecule, and a compound having a hydroxyl group at a portion other than the terminal of the molecule. The polyol compound may be used solely or as a mixture of at least two of them.

Examples of the compound having the hydroxyl group at the terminal of the molecule include a low molecular weight polyol having a molecular weight of less than 500 and a high molecular weight polyol having an average molecular weight of 500 or more. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. Examples of the high molecular weight polyol include a polyether polyol, a polyester polyol, a polycaprolactone polyol, a polycarbonate polyol, a urethane polyol, and an acrylic polyol. Examples of the polyether polyol include polyoxyethylene glycol (PEG), polyoxypropylene glycol (PPG), and polyoxytetramethylene glycol (PTMG). Examples of the polyester polyol include polyethylene adipate (PEA), polybutylene adipate (PBA), and polyhexamethylene adipate (PHMA). Examples of the polycaprolactone polyol include poly-ε-caprolactone (PCL). Examples of the polycarbonate polyol include polyhexamethylene carbonate.

The urethane polyol is a compound having a plurality of urethane bonds in the molecule and having two or more hydroxyl groups in one molecule. Examples of the urethane polyol include a urethane prepolymer obtained by a reaction between a first polyol component and a first polyisocyanate component under a condition that the amount of hydroxyl groups in the first polyol component is excessive to the amount of isocyanate groups in the first polyisocyanate component.

Examples of the first polyol component of the urethane polyol include a polyether diol, a polyester diol, a polycaprolactone diol, and a polycarbonate diol, and the polyether diol is preferable. Examples of the polyether diol include polyoxyethylene glycol, polyoxypropylene glycol, and polyoxytetramethylene glycol. Among them, polyoxytetramethylene glycol is preferable.

The number average molecular weight of the polyether diol is preferably 500 or more, more preferably 600 or more, and is preferably 4,000 or less, more preferably 3,500 or less, even more preferably 3,000 or less. If the number average molecular weight of the polyether diol is 500 or more, the distance between crosslinking points in the paint film becomes long and the paint film becomes soft, thus the spin performance is enhanced. If the number average molecular weight of the polyether diol is 4,000 or less, the distance between crosslinking points in the paint film does not become excessively long, and thus the stain resistance of the paint film becomes better. It is noted that the average molecular weight of the polyol component can be measured, for example, by gel permeation chromatography (GPC), using polystyrene as a standard material, tetrahydrofuran as an eluate, and an organic solvent system GPC column (e.g. "Shodex (registered trademark) KF series" available from Showa Denko K.K.) as a column.

The first polyol component may include a low molecular weight polyol having a molecular weight of less than 500. Examples of the low molecular weight polyol include a diol such as ethylene glycol, diethylene glycol, triethylene glycol, 1,3-butanediol, 1,4-butanediol, neopentyl glycol, and 1,6-hexanediol; and a triol such as glycerin, trimethylolpropane, and hexanetriol. The low molecular weight polyol may be used solely or as a mixture of at least two of them.

The urethane polyol preferably includes the triol component and the diol component as the first polyol component. As the triol component, trimethylolpropane is preferable. The mixing ratio of the triol component to the diol component (triol component/diol component) is preferably 1.0 or more, more preferably 1.2 or more, and is preferably 2.6 or less, more preferably 2.4 or less, in a molar ratio of OH group.

The first polyisocyanate component constituting the urethane polyol is not particularly limited, as long as the first polyisocyanate component has at least two isocyanate groups. Examples of the first polyisocyanate component include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); and an alicydic polyisocyanate or aliphatic polyisocyanate such as 4,4'-dicyclohexylmethane diisocyanate (H$_{12}$MDI), hydrogenated xylylenediisocyanate (H$_6$XDI), hexamethylene diisocyanate (HDI), isophorone diisocyanate (IPDI), and norbomene diisocyanate (NBDI). These polyisocyanates may be used solely or as a mixture of at least two of them.

The amount of the polyether diol in the urethane polyol is preferably 70 mass % or more, more preferably 72 mass % or more, and even more preferably 75 mass % or more. The polyether diol forms a soft segment in the paint film. Thus, if the amount of the polyether diol is 70 mass % or more, the obtained golf ball has further enhanced spin performance.

The weight average molecular weight of the urethane polyol is preferably 5,000 or more, more preferably 5,300 or more, and even more preferably 5,500 or more, and is preferably 20,000 or less, more preferably 18,000 or less, and even more preferably 16,000 or less. If the weight average molecular weight of the urethane polyol is 5,000 or more, the distance between crosslinking points in the paint film becomes long and the paint film becomes soft, thus the spin performance is enhanced. If the weight average molecular weight of the urethane polyol is 20,000 or less, the distance between crosslinking points in the paint film does not become excessively long, and thus the stain resistance of the paint film becomes better.

The hydroxyl value of the urethane polyol is preferably 10 mgKOH/g or more, more preferably 15 mgKOH/g or more, and even more preferably 20 mgKOH/g or more, and is preferably 200 mgKOH/g or less, more preferably 190 mgKOH/g or less, and even more preferably 180 mgKOH/g or less. It is noted that the hydroxyl value can be measured according to JIS K 1557-1, for example, by an acetylation method.

Examples of the compound having the hydroxyl group at the part other than the terminal of the molecule include a polyrotaxane having a hydroxyl group, and a hydroxyl group modified vinyl chloride-vinyl acetate copolymer.

The polyrotaxane having the hydroxyl group has a cyclodextrin, a linear molecule piercing through the cyclic structure of the cyclodextrin, and blocking groups located at both terminals of the linear molecule to prevent disassociation of the cyclic molecule. The polyrotaxane is viscoelastic, since the cyclodextrin molecule is movable along the linear molecule that penetrates the cyclodextrin in a skewering manner (pulley effect). Even if a tension is applied to the polyrotaxane, the tension can be uniformly dispersed due to the pulley effect. Thus, the polyrotaxane has an excellent property that a crack or scratch very hardly occurs, unlike a conventional crosslinked polymer.

The cydodextrin is a general term for an oligosaccharide having a cyclic structure. The cydodextrin is, for example, a molecule having 6 to 8 D-glucopyranose residues being linked in a cyclic shape via an $\alpha$-1,4-glucoside bond. Examples of the cyclodextrin include $\alpha$-cydodextrin (number of glucose units: 6), $\beta$-cycldodextrin (number of glucose units: 7), and $\gamma$-cyclodextrin (number of glucose units: 8), and $\alpha$-cydodextrin is preferable. As the cyclodextrin, one type may be used solely, and two or more types may be used in combination.

The linear molecule is not particularly limited, as long as it is a linear molecule capable of piercing through the cyclic structure of the cyclodextrin so that the cyclic structure of the cyclodextrin is movable along and rotatable around the linear molecule. Examples of the linear molecule include polyalkylene, polyester, polyether, and polyacrylic acid. Among them, polyether is preferable, and polyethylene glycol is particularly preferable. Polyethylene glycol has less steric hindrance, and thus can easily pierce through the cyclic structure of the cyclodextrin in a skewering manner.

The weight average molecular weight of the linear molecule is preferably 5,000 or more, more preferably 6,000 or more, and is preferably 100,000 or less, more preferably 80,000 or less.

The linear molecule preferably has functional groups at both terminals thereof. When the linear molecule has the functional group, the linear molecule can easily react with the blocking group. Examples of the functional group include a hydroxyl group, a carboxyl group, an amino group, and a thiol group.

The blocking group is not particularly limited, as long as the blocking group is located at both terminals of the linear molecule to prevent the disassociation of the cydodextrin from the linear molecule. Examples of the method for preventing the disassociation include a method of using a bulky blocking group to physically prevent the disassociation, and a method of using an ionic blocking group to electrostatically prevent the disassociation. Examples of the bulky blocking group include a cyclodextrin and an adamantyl group. The number of the cydodextrins kept by the linear molecule (kept amount) preferably ranges from 0.06 to 0.61, more preferably ranges from 0.11 to 0.48, and even more preferably ranges from 0.24 to 0.41, if the maximum kept amount thereof is deemed as 1. This is because if the number is less than 0.06, the pulley effect may not be exerted, and if the number exceeds 0.61, the cydodextrins are very densely located, so that the movability of the cydodextrin may decrease.

As the polyrotaxane, a polyrotaxane having at least a part of hydroxyl groups of the cyclodextrin being modified with a caprolactone chain, is preferred. Modifying with the caprolactone alleviates the steric hindrance between the polyrotaxane and the polyisocyanate, thereby enhancing the reaction efficiency with the polyisocyanate.

As the above modification, for example, the hydroxyl groups of the cyclodextrin are treated with propylene oxide to hydroxypropylated the cyclodextrin, and then $\epsilon$-caprolactone is added to perform ring-opening polymerization. As a result of this modification, the caprolactone chain $-(CO(CH_2)_5O)_nH$ (n is a natural number of 1 to 100) is linked to the exterior side of the cyclic structure of the cyclodextrin via a $-O-C_3H_6-O-$ group. "n" represents the degree of polymerization, and is preferably a natural number ranging from 1 to 100, more preferably a natural number ranging from 2 to 70, and even more preferably a natural number ranging from 3 to 40. At another terminal of the caprolactone chain, a hydroxyl group is formed through the ring-opening polymerization. The terminal hydroxyl group of the caprolactone chain can react with the polyisocyanate.

The ratio of the hydroxyl groups modified with the caprolactone chain to all the hydroxyl groups (100 mole %) included in the cyclodextrin before the modification is preferably 2 mole % or more, more preferably 5 mole % or more, even more preferably 10 mole % or more. If the ratio of the hydroxyl groups modified with the caprolactone chain falls within the above range, the hydrophobicity of the polyrotaxane increases, and the reactivity with the polyisocyanate increases.

The hydroxyl value of the polyrotaxane is preferably 10 mg KOH/g or more, more preferably 15 mg KOH/g or more, even more preferably 20 mg KOH/g or more, and is preferably 400 mg KOH/g or less, more preferably 300 mg KOH/g or less, even more preferably 220 mg KOH/g or less, particularly preferably 180 mg KOH/g or less. If the hydroxyl value of the polyrotaxane falls within the above range, the reactivity with the polyisocyanate increases, and thus the durability of the paint film becomes more favorable.

The total molecular weight of the polyrotaxane is preferably 30,000 or more, more preferably 40,000 or more, and even more preferably 50,000 or more, and is preferably 3,000,000 or less, more preferably 2,500,000 or less, and even more preferably 2,000,000 or less, in a weight average molecular weight. If the weight average molecular weight is 30,000 or more, the paint film has sufficient strength, and if the weight average molecular weight is 3,000,000 or less, the paint film has sufficient flexibility and thus approach performance of the golf ball increases. It is noted that the weight average molecular weight of the polyrotaxane can be measured, for example, by gel permeation chromatography (GPC) using polystyrene as a standard substance, tetrahydrofuran as an eluant, and an organic solvent system GPC column (e.g., "Shodex (registered trademark) KF series" available from Showa Denko K.K.) as a column.

Specific examples of the polyrotaxane modified with the polycaprolactone include SeRM super polymer SH3400P, SH2400P, and SH1310P available from Advanced Softmaterials Inc.

The hydroxyl group modified vinyl chloride-vinyl acetate copolymer adjusts the adhesion of the paint film while maintaining the scratch resistance of the paint film. The hydroxyl group modified vinyl chloride-vinyl acetate copolymer is obtained, for example, by a method of copolymerizing vinyl chloride, vinyl acetate and a monomer having a hydroxyl group (e.g., polyvinyl alcohol, hydroxyalkyl acrylate), or by a method of partially or completely saponifying a vinyl chloride-vinyl acetate copolymer.

The amount of the vinyl chloride component in the hydroxyl group modified vinyl chloride-vinyl acetate copolymer is preferably 1 mass % or more, more preferably 20 mass % or more, even more preferably 50 mass % or more, and is preferably 99 mass % or less, more preferably 95 mass % or less. Specific examples of the hydroxyl group modified vinyl chloride-vinyl acetate copolymer include Solbin (registered trademark) A, Solbin AL, and Solbin TA3 available from Nissin Chemical Industry Co., Ltd.

Preferable embodiments of the polyol composition are an embodiment containing a urethane polyol, wherein the urethane polyol includes a polyether diol having a number average molecular weight in a range of from 600 to 3000 as a constituent component (first embodiment); and an embodiment containing a polyrotaxane, wherein the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via a —O—$C_3H_6$—O— group (second embodiment).

In the first embodiment, the amount of the urethane polyol in the polyol component contained in the polyol composition is preferably 60 mass % or more, more preferably 70 mass % or more, and even more preferably 80 mass % or more. It is also preferable that the polyol compound of the polyol composition according to the first embodiment consists of the urethane polyol.

In the second embodiment, the amount of the polyrotaxane in the polyol component contained in the polyol composition is preferably 30 mass % or more, more preferably 45 mass % or more, and even more preferably 60 mass % or more, and is preferably 100 mass % or less, more preferably 90 mass % or less, and even more preferably 85 mass % or less.

The polyol composition according to the second embodiment preferably contains the polycaprolactone polyol. The mass ratio of the polycaprolactone polyol to the polyrotaxane (polycaprolactone polyol/polyrotaxane) is preferably 0/100 or more, more preferably 5/95 or more, and even more preferably 10/90 or more, and is preferably 90/10 or less, more preferably 85/15 or less, and even more preferably 80/20 or less.

The polyol composition according to the second embodiment preferably contains the hydroxyl group modified vinyl chloride-vinyl acetate copolymer. The amount of the hydroxyl group modified vinyl chloride-vinyl acetate copolymer in the polyol compound contained in the polyol composition is preferably 4 mass % or more, more preferably 8 mass % or more, and is preferably 50 mass % or less, more preferably 45 mass % or less.

(Polyisocyanate Composition)

Examples of the polyisocyanate component of the polyisocyanate composition used in the present invention include a compound having at least two isocyanate groups. Examples of the polyisocyanate include an aromatic polyisocyanate such as 2,4-tolylene diisocyanate, 2,6-tolylene diisocyanate, a mixture of 2,4-tolylene diisocyanate and 2,6-tolylene diisocyanate (TDI), 4,4'-diphenylmethane diisocyanate (MDI), 1,5-naphthylene diisocyanate (NDI), 3,3'-bitolylene-4,4'-diisocyanate (TODI), xylylene diisocyanate (XDI), tetramethylxylylenediisocyanate (TMXDI), and para-phenylene diisocyanate (PPDI); an alicyclic polyisocyanate or aliphatic polyisocyanate such as 4,4'-dicyclohexylmethane diisocyanate ($H_{12}$MDI), hydrogenated xylylenediisocyanate ($H_6$XDI), hexamethylene diisocyanate (HDI), isophorone diisocyanate (IPDI), and norbornene diisocyanate (NBDI); and derivatives of these polyisocyanates. In the present invention, two or more polyisocyanates may be used as the polyisocyanate.

Examples of the derivative of the polyisocyanate include an adduct-modified product obtained by a reaction between a diisocyanate and a polyhydric alcohol; an isocyanurate-modified product of a diisocyanate; a biuret-modified product of a diisocyanate; and an allophanate-modified product of a diisocyanate. The derivative of the polyisocyanate from which free diisocyanate is removed is more preferable.

The adduct-modified product is a polyisocyanate obtained by a reaction between a diisocyanate and a polyhydric alcohol. Preferable examples of the polyhydric alcohol include a low molecular weight triol such as trimethylolpropane and glycerin. As the adduct-modified product, for example, an adduct-modified product of hexamethylene diisocyanate is preferable, a triisocyanate (the following formula (1)) obtained by a reaction between hexamethylene diisocyanate and trimethylolpropane; and a triisocyanate (the following formula (2)) obtained by a reaction between hexamethylene diisocyanate and glycerin are more preferable.

(1)

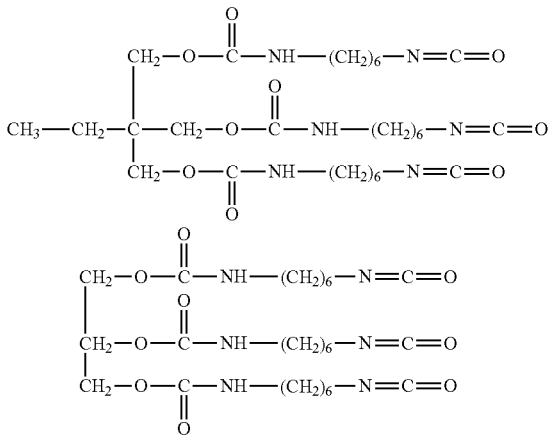

Examples of the isocyanurate-modified product include an isocyanurate modified product of hexamethylene diisocyanate, and an isocyanurate-modified product of isophorone diisocyanate. A trimer of hexamethylene diisocyanate (the following formula (3)) or a trimer of isophorone diisocyanate is preferable.

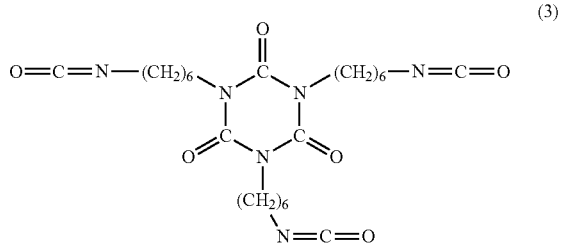

(3)

Examples of the biuret-modified product include a trimerized product of a diisocyanate, and a trimer of hexamethylene diisocyanate (the following formula (4)) is preferable.

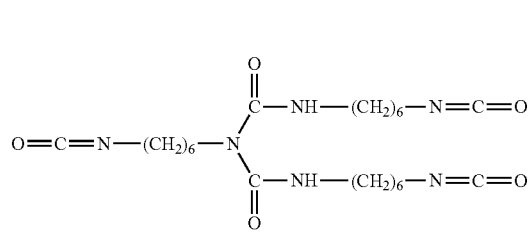

(4)

The allophanate-modified product is, for example, a triisocyanate obtained by further reacting a diisocyanate with a urethane bond formed by a reaction between a diisocyanate and a low molecular weight diol.

As the polyisocyanate component, the adduct-modified product is preferable, the adduct-modified product (preferably a trimer) of hexamethylene diisocyanate is more preferable. When the adduct-modified product of hexamethylene diisocyanate is used, the amount of the adduct-modified product of hexamethylene diisocyanate in the polyisocyanate component is preferably 10 mass % or more, more preferably 20 mass % or more, and even more preferably 30 mass % or more. It is also preferable that the polyisocyanate component consists of the adduct-modified product of hexamethylene diisocyanate.

In addition, as the polyisocyanate component, the isocyanurate-modified product is also preferable, the isocyanurate-modified product (preferably the trimer) of hexamethylene diisocyanate or the isocyanurate-modified product (preferably the trimer) of isophorone diisocyanate is more preferable, and a combination of the isocyanurate-modified product (preferably the trimer) of hexamethylene diisocyanate and the isocyanurate-modified product (preferably the trimer) of isophorone diisocyanate is even more preferable. In the case that the combination of the isocyanurate-modified product of hexamethylene diisocyanate and the isocyanurate-modified product of isophorone diisocyanate is used, the mass ratio (isocyanurate-modified product of hexamethylene diisocyanate/isocyanurate-modified product of isophorone diisocyanate) of the isocyanurate-modified product of hexamethylene diisocyanate to the isocyanurate-modified product of isophorone diisocyanate is preferably 0.1 or more, more preferably 0.2 or more, and even more preferably 0.3 or more, and is preferably 9 or less, more preferably 4 or less, and even more preferably 3 or less. If the mass ratio falls within the above range, the spin rate on approach shots under a condition that there is grass between the golf ball and the dub face increases.

In addition, as the polyisocyanate component, it is preferable that the adduct-modified product and the isocyanurate-modified product are used in combination, it is more preferable that the adduct-modified product (preferably the trimer) of hexamethylene diisocyanate and the isocyanurate-modified product (preferably the trimer) of hexamethylene diisocyanate are used in combination, or the adduct-modified product (preferably the trimer) of hexamethylene diisocyanate and the isocyanurate-modified product (preferably the trimer) of isophorone diisocyanate are used in combination. In this case, the mass ratio (adduct-modified product/isocyanurate-modified product) of the adduct-modified product to the isocyanurate-modified product is preferably 0.1 or more, more preferably 0.2 or more, and even more preferably 0.3 or more. If the mass ratio is 0.1 or more, the spin rate on approach shots under a condition that there is grass between the golf ball and the dub face further increases.

In addition, when the adduct-modified product of hexamethylene diisocyanate and the isocyanurate-modified product of hexamethylene diisocyanate are used as the polyisocyanate component, the total amount of the adduct-modified product of hexamethylene diisocyanate and the isocyanurate-modified product of hexamethylene diisocyanate in the polyisocyanate component is preferably 70 mass % or more, more preferably 80 mass % or more, and even more preferably 90 mass % or more. It is also preferable that the polyisocyanate component consists of the adduct-modified product of hexamethylene diisocyanate and the isocyanurate-modified product of hexamethylene diisocyanate.

In the case that the isocyanurate-modified product of hexamethylene diisocyanate and the isocyanurate-modified product of isophorone diisocyanate are used as the polyisocyanate component, the total amount of the isocyanurate-modified product of hexamethylene diisocyanate and the isocyanurate-modified product of isophorone diisocyanate in the polyisocyanate component is preferably 70 mass % or more, more preferably 80 mass % or more, and even more preferably 90 mass % or more. It is also preferable that the polyisocyanate component consists of the isocyanurate-modified product of hexamethylene diisocyanate and the isocyanurate-modified product of isophorone diisocyanate.

In the case that the adduct-modified product of hexamethylene diisocyanate and the isocyanurate-modified product of isophorone diisocyanate are used as the polyisocyanate component, the total amount of the adduct-modified product of hexamethylene diisocyanate and the isocyanurate-modified product of isophorone diisocyanate in the polyisocyanate component is preferably 70 mass % or more, more preferably 80 mass % or more, and even more preferably 90 mass % or more. It is also preferable that the polyisocyanate component consists of the adduct-modified product of hexamethylene diisocyanate and the isocyanurate-modified product of isophorone diisocyanate.

The amount (NCO %) of the isocyanate group of the polyisocyanate component is preferably 0.5 mass % or more, more preferably 1.0 mass % or more, and even more preferably 2.0 mass % or more, and is preferably 45 mass % or less, more preferably 40 mass % or less, and even more preferably 35 mass % or less. It is noted that the amount (NCO %) of the isocyanate group of the polyisocyanate component can be represented by 100×[mole number of isocyanate group in polyisocyanate×42 (molecular weight of NCO)]/[total mass (g) of polyisocyanate].

Specific examples of the polyisocyanate component include Burnock (Registered trademark) D-800, Burnock DN-950, and Burnock DN-955 available from DIC corporation; Desmodur (Registered trademark) N75MPA/X, Desmodur N3300, Desmodur N3390, Desmodur L75 (C), and Sumidur (Registered trademark) E21-1 available from Sumika Bayer Urethane Co., Ltd.; Coronate (Registered trademark) HX, Coronate HK, Coronate HL, and Coronate EH available from Tosoh Corporation; Duranate (Registered trademark) 24A-100, Duranate 21S-75E, Duranate TPA-100, Duranate TKA-100, and Duranate 24A-90CX available from Asahi Kasei Chemicals Corporation; and VESTANAT (Registered trademark) T1890 available from Degussa Co., Ltd.

In the curing reaction of the curing type paint composition, the molar ratio (NCO group/OH group) of the isocyanate group (NCO group) included in the polyisocyanate composition to the hydroxyl group (OH group) included in the polyol composition is preferably 0.1 or more, more preferably 0.2 or more. If the molar ratio (NCO group/OH group) is less than 0.1, the curing reaction is insufficient. In addition, if the molar ratio (NCO group/OH group) is excessively large, the amount of the isocyanate group is excessive, and the obtained paint film does not only become hard and fragile but also has deteriorated poor appearance. Thus, the molar ratio (NCO group/OH group) is preferably 1.5 or less, more preferably 1.4 or less, and even more preferably 1.3 or less. It is noted that the reason why the appearance of the obtained paint film deteriorates if the amount of the isocyanate group in the paint becomes excessive is that an excessive amount of the isocyanate group may promote a reaction between the moisture in air and the isocyanate group, thereby generating a lot of carbon dioxide gas.

When the polyol composition according to the first embodiment is used as the polyol composition, the polyisocyanate composition preferably contains the biuret-modified product of hexamethylene diisocyanate, the isocyanurate-modified product of hexamethylene diisocyanate and the isocyanurate-modified product of isophorone diisocyanate. When the biuret-modified product and isocyanurate-modified product of hexamethylene diisocyanate are used in combination, the mixing ratio (biuret-modified product/isocyanurate-modified product) preferably ranges from 20/40 to 40/20, more preferably ranges from 25/35 to 35/25 in a mass ratio.

When the polyol composition according to the second embodiment is used as the polyol composition, the polyisocyanate composition preferably contains at least one member selected from the group consisting of the adduct-modified product of hexamethylene diisocyanate, the isocyanurate-modified product of hexamethylene diisocyanate, and the isocyanurate-modified product of isophorone diisocyanate.

The paint may be either a waterborne paint mainly containing water as a dispersion medium or a solvent-based paint mainly containing an organic solvent as a dispersion medium, but is preferably the solvent-based paint. In the case of the solvent-based paint, examples of the preferable solvent include toluene, isopropyl alcohol, xylene, methylethyl ketone, methylisobutyl ketone, ethylene glycol monomethyl ether, ethylbenzene, propylene glycol monomethyl ether, isobutyl alcohol, and ethyl acetate. It is noted that the solvent may be added in either of the polyol composition and the polyisocyanate composition, and in light of uniformly performing the curing reaction, the solvent is preferably added in the polyol composition and the polyisocyanate composition, respectively.

The paint preferably further contains a modified silicone. If the modified silicone is contained as a leveling agent, unevenness of the coated surface can be reduced, and thus a smooth coated surface can be formed on the surface of the golf ball. Examples of the modified silicone include a modified silicone having an organic group being introduced to a side chain or terminal of a polysiloxane skeleton, a polysiloxane block copolymer obtained by copolymerizing a polyether block and/or a polycaprolactone block, etc. with a polysiloxane block, and a modified silicone having an organic group being introduced to a side chain or terminal of a polysiloxane block copolymer. The polysiloxane skeleton or the polysiloxane block is preferably linear, and examples thereof include dimethyl polysiloxane, methylphenyl polysiloxane, and methyl hydrogen polysiloxane. Examples of the organic group include an amino group, epoxy group, mercapto group, and carbinol group. In the present invention, as the modified silicone oil, a polydimethylsiloxane-polycaprolactone block copolymer is preferably used, and a terminal carbinol modified polydimethylsiloxane-polycaprolactone block copolymer is more preferably used. This is because these block copolymers have excellent compatibility with the caprolactone modified polyrotaxane and the polycaprolactone polyol. Specific examples of the modified silicone used in the present invention include DBL-C31, DBE-224, and DCE-7521 available from Gelest, Inc.

The modified silicone remains in the paint film formed from the paint composition. The amount of the modified silicone in the paint film and in the curing type paint composition is preferably 0.01 part by mass or more, more preferably 0.05 part by mass or more, and is preferably 10 parts by mass or less, more preferably 5 part by mass or less, with respect to 100 parts by mass of the base resin component constituting the outermost layer of the paint film.

In the curing reaction, a conventional catalyst may be used. Examples of the catalyst include a monoamine such as triethyl amine and N,N-dimethylcyclohexylamine; a polyamine such as N,N,N',N'-tetramethylethylene diamine and N,N,N',N'', N'''-pentamethyldiethylene triamine; a cyclic diamine such as 1,8-diazabicyclo[5.4.0]-7-undecene (DBU) and triethylene diamine; and a tin catalyst such as dibutyltin dilaurate and dibutyltin diacetate. These catalysts may be used solely, or two or more of the catalysts may be used in combination. Among them, the tin catalyst such as dibutyltin dilaurate and dibutyltin diacetate is preferable, and dibutyltin dilaurate is particularly preferable.

The paint film may further contain additives generally contained in a paint for a golf ball, such as an ultraviolet absorber, an antioxidant, a light stabilizer, a fluorescent brightener, an anti-blocking agent, a leveling agent, a slip agent, and a viscosity modifier, where necessary.

In the case of a multiple layered paint film, examples of the base resin constituting the layer of the paint film other than the outermost layer of the paint film include a urethane resin, an epoxy resin, an acrylic resin, a vinyl acetate resin, and a polyester resin, and among them, the urethane resin is preferable. The layer of the paint film other than the outermost layer of the paint film may be formed from a paint same as or different from the paint for forming the outermost layer of the paint film.

(Golf Ball)

The golf ball according to the present invention is not particularly limited, as long as the golf ball comprises a golf ball body and a paint film composed of at least one layer and formed on a surface of the golf ball body. The construction of the golf ball body is not particularly limited, and the golf ball body may be a one-piece golf ball, a two-piece golf ball, a multi-piece golf ball such as a golf ball composed of three or more pieces, or a wound golf ball. The present invention can be applied appropriately to any one of the above golf balls.

(Core)

The one-piece golf ball body and the core used for a wound golf ball, two-piece golf ball and multi-piece golf ball will be explained.

The one-piece golf ball body or the core may be formed from a conventionally known rubber composition (hereinafter sometimes simply referred to as "core rubber composition"). For example, the one-piece golf ball body or the core may be formed by heat pressing a rubber composition containing a base rubber, a co-crosslinking agent and a crosslinking initiator.

As the base rubber, particularly preferable is a high cis-polybutadiene having a cis-bond in a proportion of 40 mass % or more, more preferably 70 mass % or more, and even more preferably 90 mass % or more in view of its advantageous resilience. As the co-crosslinking agent, an $\alpha,\beta$-unsaturated carboxylic acid having 3 to 8 carbon atoms or a metal salt thereof is preferable, and a metal salt of acrylic acid or a metal salt of methacrylic acid is more preferable. As the metal constituting the metal salt, zinc, magnesium, calcium, aluminum or sodium is preferable, and zinc is more preferable. The amount of the co-crosslinking agent is preferably 20 parts by mass or more and 50 parts by mass or less with respect to 100 parts by mass of the base rubber. In the case that the $\alpha,\beta$-unsaturated carboxylic acid having 3 to 8 carbon atoms is used as the co-crosslinking agent, a metal compound (e.g. magnesium oxide) is preferably used. As the crosslinking initiator, an organic peroxide is preferably used. Specific examples of the organic peroxide include dicumyl peroxide, 1,1-bis(t-butylperoxy)-3,3,5-trimethylcyclohexane, 2,5-dimethyl-2,5-di(t-butylperoxy) hexane, and di-t-butyl peroxide. Among them, dicumyl peroxide is preferably used. The amount of the crosslinking initiator is preferably 0.2 part by mass or more, more preferably 0.3 part by mass or more, and is preferably 3 parts by mass or less, more preferably 2 parts by mass or less, with respect to 100 parts by mass of the base rubber.

In addition, the core rubber composition may further contain an organic sulfur compound. As the organic sulfur compound, diphenyl disulfides (e.g. diphenyl disulfide, bis (pentabromophenyl) disulfide), thiophenols and thionaphthols (e.g. 2-thionaphthol) are preferably used. The amount of the organic sulfur compound is preferably 0.1 part by mass or more, more preferably 0.3 part by mass or more, and is preferably 5.0 parts by mass or less, more preferably 3.0 parts by mass or less, with respect to 100 parts by mass of the base rubber. The core rubber composition may further contain a carboxylic acid and/or a salt thereof. As the carboxylic acid and/or the salt thereof, a carboxylic acid having 1 to 30 carbon atoms and/or a salt thereof is preferable. As the carboxylic acid, an aliphatic carboxylic acid or an aromatic carboxylic acid (e.g. benzoic acid) may be used. The amount of the carboxylic acid and/or the salt thereof is preferably 1 part by mass or more and 40 parts by mass or less with respect to 100 parts by mass of the base rubber.

The core rubber composition may further appropriately contain a weight adjusting agent such as zinc oxide and barium sulfate, an antioxidant, or a colored powder, in addition to the base rubber, the co-crosslinking agent, the crosslinking initiator, and the organic sulfur compound. The molding conditions for heat pressing the core rubber composition may be appropriately set depending on the rubber formulation. Generally, the heat pressing is preferably carried out at 130° C. to 200° C. for 10 to 60 minutes, or carried out in a two-step heating of heating at 130° C. to 150° C. for 20 to 40 minutes followed by heating at 160° C. to 180° C. for 5 to 15 minutes.

(Cover)

The golf ball body preferably comprises a core and a cover covering the core. In this case, the hardness of the cover is preferably 60 or less, more preferably 55 or less, even more preferably 50 or less, and most preferably 45 or less in Shore D hardness. If the hardness of the cover is 60 or less in Shore D hardness, the spin rate is further increased. The lower limit of the hardness of the cover is not particularly limited, and it is preferably 10, more preferably 15, and even more preferably 20 in Shore D hardness. The hardness of the cover is a slab hardness of the cover composition molded into a sheet shape.

The thickness of the cover is preferably 0.1 mm or more, more preferably 0.2 mm or more, and even more preferably 0.3 mm or more, and is preferably 1.0 mm or less, more preferably 0.9 mm or less, and even more preferably 0.8 mm or less. If the thickness of the cover is 0.1 mm or more, the shot feeling of the golf ball is better, and if the thickness of the cover is 1.0 mm or less, the resilience of the golf ball can be maintained.

The resin component constituting the cover is not particularly limited, and examples thereof include various resins such as an ionomer resin, a polyester resin, a urethane resin and a polyamide resin; a thermoplastic polyamide elastomer having a trade name of "Pebax (registered trademark) (e.g. "Pebax 2533")" available from Arkema Inc.; a thermoplastic polyester elastomer having a trade name of "Hytrel (registered trademark) (e.g. "Hytrel 3548" and "Hytrel 4047")" available from Du Pont-Toray Co., Ltd.; a thermoplastic polyurethane elastomer having a trade name of "Elastollan (registered trademark) (e.g. "Elastollan XNY97A")" available from BASF Japan Ltd.; and a thermoplastic styrene elastomer having a trade name of "TEFABLOC" or thermoplastic polyester elastomer available from Mitsubishi Chemical Corporation. These cover materials may be used solely, or two or more of these cover materials may be used in combination.

Among them, the resin component constituting the cover is preferably the polyurethane resin or the ionomer resin, particularly preferably the polyurethane resin. When the resin component constituting the cover includes the polyurethane resin, the amount of the polyurethane resin in the resin component is preferably 50 mass % or more, more preferably 70 mass % or more, and even more preferably 90 mass % or more. When the resin component constituting the cover includes the ionomer resin, the amount of the ionomer resin in the resin component is preferably 50 mass % or more, more preferably 70 mass % or more, and even more preferably 90 mass % or more.

The polyurethane may be either a thermoplastic polyurethane or a thermosetting polyurethane. The thermoplastic polyurethane is a polyurethane exhibiting plasticity by heating and generally means a polyurethane having a linear chain structure of a high-molecular weight to a certain extent. On the other hand, the thermosetting polyurethane (two-component curing type polyurethane) is a polyurethane obtained by polymerization through a reaction between a low-molecular weight urethane prepolymer and a curing agent (chain extender) when molding the cover. The thermosetting polyurethane includes a polyurethane having a linear chain structure or a polyurethane having a three-dimensional crosslinked structure depending on the number of the functional group of the prepolymer or the curing agent (chain extender) to be used. As the polyurethane, the thermoplastic elastomer is preferable.

The cover may further contain a pigment component such as a white pigment (e.g. titanium oxide), a blue pigment and a red pigment, a weight adjusting agent such as calcium carbonate and barium sulfate, a dispersant, an antioxidant, an ultraviolet absorber, a light stabilizer, a fluorescent material or a fluorescent brightener, or the like, in addition to the above resin component, as long as they do not impair the performance of the cover.

The method for molding the cover from the cover composition is not particularly limited, and examples thereof include a method of injection molding the cover composition directly onto the core; and a method of molding the cover composition into hollow shells, covering the core with a plurality of the hollow shells and compression molding the core with a plurality of the hollow shells (preferably a method of molding the cover composition into half hollow-shells, covering the core with two of the half hollow-shells and compression molding the core with two of the half hollow-shells). The golf ball body having the cover formed thereon is ejected from the mold, and as necessary, the golf ball body is preferably subjected to surface treatments such as deburring, cleaning, and sandblast. In addition, if desired, a mark may also be formed thereon.

The total number of the dimples formed on the cover is preferably 200 or more and 500 or less. If the total number of the dimples is less than 200, the dimple effect is hardly obtained, and if the total number of the dimples exceeds 500, the dimple effect is hardly obtained because the size of the respective dimples is small. The shape (shape in a plan view) of the dimples includes, for example, but is not limited to, a circle; a polygonal shape such as a roughly triangular shape, a roughly quadrangular shape, a roughly pentagonal shape, and a roughly hexagonal shape; and other irregular shape. The shape of the dimples may be employed solely, or two or more of the shapes may be employed in combination.

When the golf ball is a multi-piece golf ball such as a three-piece golf ball, a four-piece golf ball and a golf ball composed of five or more pieces, examples of the material for forming the intermediate layer disposed between the core and the outermost cover include a thermoplastic resin such as a polyurethane resin, an ionomer resin, a polyamide resin, and a polyethylene; a thermoplastic elastomer such as a styrene elastomer, a polyolefin elastomer, a polyurethane elastomer, and a polyester elastomer; and a cured product of a rubber composition. Herein, examples of the ionomer resin include a product obtained by neutralizing at least a part of carboxyl groups of a copolymer composed of ethylene and an α,β-unsaturated carboxylic acid with a metal ion; and a product obtained by neutralizing at least a part of carboxyl groups of a ternary copolymer composed of ethylene, an α,β-unsaturated carboxylic acid and an α,β-unsaturated carboxylic acid ester with a metal ion. The intermediate layer may further contain a weight adjusting agent such as barium sulfate and tungsten, an antioxidant, a pigment, and the like. It is noted that the intermediate layer is sometimes referred to as an inner cover or an outer core, depending on the construction of the golf ball.

(Formation of Paint Film)

The paint film of the golf ball according to the present invention can be formed by applying the paint on the surface of the golf ball body. The method of applying the paint is not particularly limited, a conventional method can be adopted, and examples thereof include a spray coating and electrostatic coating.

In the case of performing the spray coating with an air gun, the polyisocyanate composition and the polyol composition are fed with respective pumps and continuously mixed with a line mixer located in the stream line just before the air gun, and the obtained mixture is air-sprayed. Alternatively, the polyol and the polyisocyanate are air-sprayed respectively with an air spray system provided with a device for controlling the mixing ratio thereof. The paint application may be conducted by spraying the paint one time or overspraying the paint multiple times.

The paint applied on the golf ball body can be dried, for example, at a temperature in a range of from 30° C. to 70° C. for 1 hour to 24 hours, to form the paint film.

The golf ball according to the present invention comprises a paint film composed of at least one layer and formed on the surface of the golf ball body. In a case of a multiple layered paint film, the outermost layer of the paint film located at the outermost layer of the golf ball contains the porous filler. In a case of a single layered paint film, the single layered paint film is the outermost layer of the paint film, and the single layered outermost paint film contains the porous filler.

The thickness of the outermost layer of the paint film of the golf ball according to the present invention is preferably 5 μm or more, more preferably 7 μm or more, and is preferably 40 μm or less, more preferably 30 μm or less, and even more preferably 20 μm or less. If the thickness of the outermost layer of the paint film falls within the above range, the appearance is better, the abrasion resistance of the golf ball is better, and the approach performance is better.

In the case that the paint film of the golf ball according to the present invention has a multiple layered structure, the total thickness of the paint film is preferably 5 μm or more, more preferably 7 μm or more, and even more preferably 9 μm or more, and is preferably 50 μm or less, more preferably 45 μm or less, and even more preferably 40 μm or less. If the thickness is 5 μm or more, the spin rate on approach shots increases, and if the thickness is 50 μm or less, the spin rate on driver shots can be suppressed.

The ratio (d/T) of the volume average particle size (d: μm) of the porous filler to the thickness (T: μm) of the outermost layer of the paint film containing the porous filler is preferably 0.01 or more, more preferably 0.05 or more, and even more preferably 0.1 or more, and is preferably 2.0 or less, more preferably 1.5 or less, and even more preferably 1.0 or less. If the ratio (d/T) is 0.01 or more, the water-discharging effect is greater and thus the spin performance under a wet condition is further enhanced, and if the ratio (d/T) is 2.0 or less, the appearance is better and the stain attachment can be decreased.

The whole particle of the porous filler may exist inside the outermost layer of the paint film, or alternatively a part of the particle of the porous filler may be exposed on the surface of the outermost layer of the paint film. It is noted that it is preferable that the whole particle of the porous filler exists inside the outermost layer of the paint film, i.e. the porous filler is not exposed on the surface of the outermost layer of the paint film.

The water sliding angle of the surface of the outermost layer of the paint film of the golf ball according to the present invention is preferably less than 50°, more preferably 45° or less, and even more preferably 40° or less. If the water sliding angle is less than 50°, the water-discharging effect during the flight on a rainy day is greater. The lower limit of the water sliding angle is not particularly limited, but it is generally 10°. The sliding angle is a tilt angle at which a liquid begins to slide downward when a solid sample having a level solid surface on which a static liquid exists, is slowly tilted.

The adhesion energy of the surface of the outermost layer of the paint film of the golf ball according to the present invention is preferably less than 10 mJ/m$^2$, more preferably 9 mJ/m$^2$ or less, and even more preferably 8 mJ/m$^2$ or less. If the adhesion energy is less than 10 mJ/m$^2$, the water-discharging effect during the flight on a rainy day is greater. The lower limit of the adhesion energy is not particularly limited, but it is generally 4 mJ/m$^2$.

The dynamic friction coefficient of the outermost layer of the paint film of the golf ball according to the present invention is preferably 0.65 or more, more preferably 0.68 or more, even more preferably 0.70 or more, and most preferably 0.72 or more, and is preferably 1.3 or less, more preferably 1.2 or less, and even more preferably 1.1 or less. If the dynamic friction coefficient is less than 0.65, the spin rate on approach shots under a condition that there is grass between the golf ball and the dub face decreases, and if the dynamic friction coefficient is more than 1.3, the paint film is too tacky and thus stain is easily attached thereon.

The peak temperature of the loss tangent (tan δ) of the outermost layer of the paint film is preferably −40° C. or more, more preferably −30° C. or more, and even more preferably −20° C. or more, and is preferably 40° C. or less, more preferably 30° C. or less, and even more preferably 20° C. or less. If the peak temperature of the loss tangent (tan δ) is −40° C. or more, the paint film has low tackiness and thus is hard to be stained, and if the peak temperature of the loss tangent (tan δ) is 40° C. or less, the paint film has a larger dynamic friction coefficient and thus the spin rate on approach shots under a condition that there is grass between the golf ball and the dub face increases.

The loss modulus (E") of the outermost layer of the paint film at the temperature of 24° C. is preferably 0.1 MPa or more, more preferably 0.5 MPa or more, and even more preferably 1.0 MPa or more, and is preferably 80 MPa or less, more preferably 65 MPa or less, and even more preferably 50 MPa or less. If the loss modulus (E") is 0.1 MPa or more, the paint film has low tackiness and thus is hard to be stained, and if the loss modulus (E") is 80 MPa or less, the paint film has a larger dynamic friction coefficient and thus the spin rate on approach shots under a condition that there is grass between the golf ball and the club face increases.

The 10% elastic modulus of the outermost layer of the paint film is preferably 1 kgf/cm$^2$ (0.10 MPa) or more, more preferably 3 kgf/cm$^2$ (0.29 MPa) or more, and even more preferably more than 10 kgf/cm$^2$ (0.98 MPa), and is preferably 50 kgf/cm$^2$ (4.9 MPa) or less, more preferably 40 kgf/cm$^2$ (3.9 MPa) or less, and even more preferably 30 kgf/cm$^2$ (2.9 MPa) or less. If the 10% elastic modulus of the outermost layer of the paint film is 1 kgf/cm$^2$ or more, the paint film has low tackiness and thus is hard to be stained, and if the 10% elastic modulus of the outermost layer of the paint film is 50 kgf/cm$^2$ or less, the paint film has a larger dynamic friction coefficient and thus the spin rate on approach shots under a condition that there is grass between the golf ball and the dub face increases.

The dynamic friction coefficient, water sliding angle, adhesion energy, 10% elastic modulus, and peak temperature of loss tangent of the outermost layer of the paint film are controlled by the type and amount of the resin component, porous filler, etc. in the paint film.

The golf ball according to the present invention preferably has a diameter in a range from 40 mm to 45 mm. In light of satisfying the regulation of US Golf Association (USGA), the diameter is particularly preferably 42.67 mm or more. In light of prevention of air resistance, the diameter is more preferably 44 mm or less, even more preferably 42.80 mm or less. In addition, the golf ball according to the present invention preferably has a mass of 40 g or more and 50 g or less. In light of obtaining greater inertia, the mass is more preferably 44 g or more, even more preferably 45.00 g or more. In light of satisfying the regulation of USGA, the mass is particularly preferably 45.93 g or less.

When the golf ball according to the present invention has a diameter in a range from 40 mm to 45 mm, the compression deformation amount (shrinking amount along the compression direction) of the golf ball when applying a load from 98 N as an initial load to 1275 N as a final load to the golf ball is preferably 2.0 mm or more, more preferably 2.2 mm or more, and is preferably 4.0 mm or less, more preferably 3.5 mm or less. If the compression deformation amount is 2.0 mm or more, the golf ball is not excessively hard and thus the shot feeling thereof is better. On the other hand, if the compression deformation amount is 4.0 mm or less, the resilience is greater.

Figure 2:
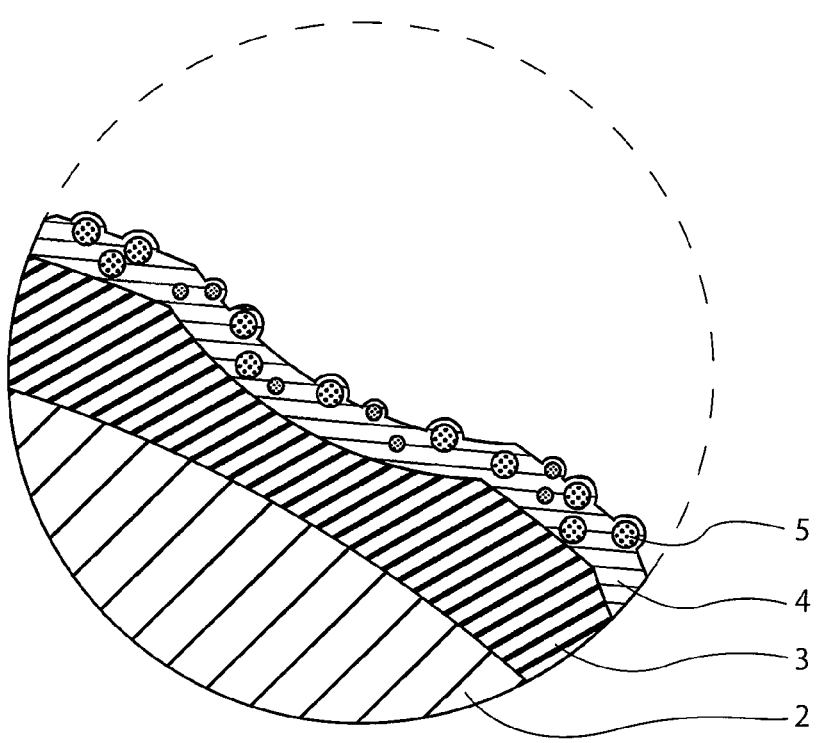
FIG. 2 is a schematic enlarged view showing a part of the golf ball of FIG. 1.

FIG. 1 is a partially cutaway cross-sectional view of a golf ball 1 according to one embodiment of the present invention. FIG. 2 is a schematic enlarged view showing a part of the golf ball of FIG. 1. The golf ball 1 comprises a spherical core 2, a cover 3 covering the spherical core 2, and a paint film 4 formed on a surface of the cover 3. The paint film 4 is an outermost layer of the paint film located at the outermost layer of the golf ball. A plurality of dimples 31 are formed on the surface of the cover 3. Other portions than the dimples 31 on the surface of the cover 3 are lands 32. The paint film 4 is single layered. The paint film 4 contains a base resin and a porous filler 5 containing SiO$_2$ in an amount of 50 mass % or more as a constituent component. Although the porous filler 5 exists inside the paint film 4 without being exposed on the paint film surface in FIG. 2, the porous filler 5 may be exposed on the paint film surface.

EXAMPLES

Next, the present invention will be described in detail by way of examples. However, the present invention is not limited to the examples described below. Various changes and modifications without departing from the spirit of the present invention are included in the scope of the present invention.

[Evaluation Method]

(1) Core Hardness (Shore C Hardness)

The hardness measured at the surface of the core was adopted as the surface hardness of the core. In addition, the core was cut into two hemispheres and the hardness measured at the central point of the obtained cut plane was adopted as the center hardness of the core. The hardness was measured with an automatic hardness tester (Digitest II available from Bareiss company) using a detector of "Shore C".

(2) Slab Hardness (Shore D Hardness)

Sheets with a thickness of about 2 mm were produced by injection molding the intermediate layer composition or the cover composition. The sheets were stored at 23° C. for two weeks. At least three of these sheets were stacked on one another so as not to be affected by the measuring substrate on which the sheets were placed, and the hardness of the stack was measured with an automatic hardness tester (Digitest II available from Bareiss company) using a detector of "Shore D".

(3) Compression Deformation Amount (Mm)

The deformation amount of the core along the compression direction (shrinking amount of the core along the compression direction), when applying a load from 98 N as an initial load to 1275 N as a final load to the core, was measured.

(4) Thickness of Paint Film (μm)

The golf ball was cut into two hemispheres, and the cross section of the paint film on the hemisphere was observed with a microscope (VHX-1000 available from Keyence Corporation) to obtain the thickness of the paint film.

Figure 3:
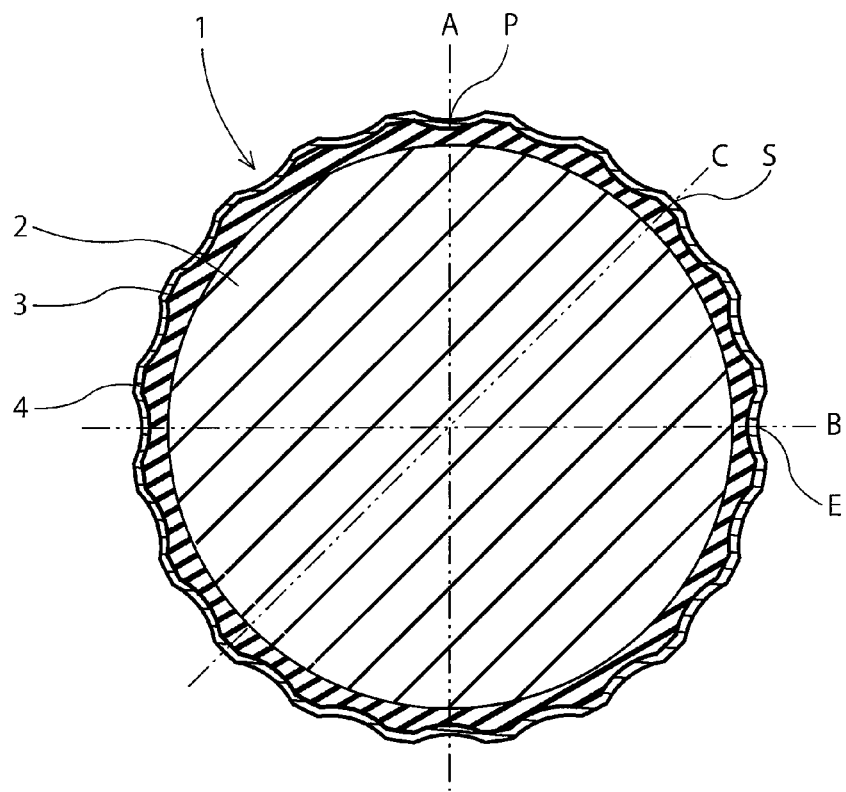
FIG. 3 is a schematic cross-sectional view illustrating a measuring location of a thickness of a paint film.

The measuring location of the film thickness will be explained by reference to FIG. 3, 4. FIG. 3 is a schematic figure of a cross section of a golf ball. As shown in FIG. 3, on the cross section of the golf ball, a straight line A passing a central point of the ball and a bottom of any dimple, a straight line B perpendicular to the straight line A, and a straight line C having an angle of 45° with the straight line A are prepared, and intersection points of these straight lines with the paint film surface are adopted as a pole P, an equator E and a shoulder S, respectively.

Figure 4:
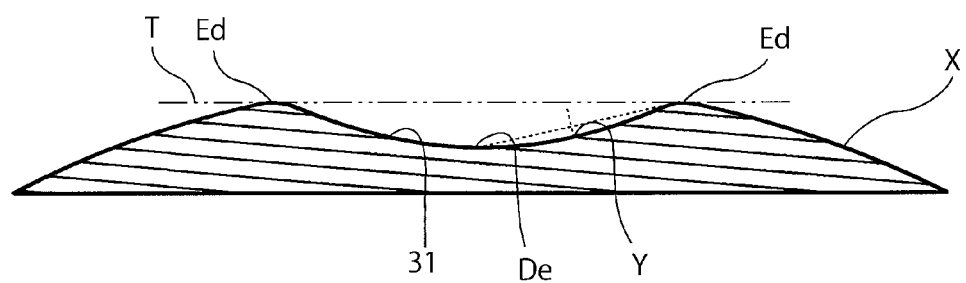
FIG. 4 is a schematic cross-sectional view illustrating a measuring location of a thickness of a paint film.

FIG. 4 is a schematic figure of a cross section passing a bottom De of a dimple 31 and a central point of a golf ball 1. The bottom De of the dimple 31 is the deepest location of the dimple 31. An edge Ed is a point of tangency of the dimple 31 with a tangent T, wherein the tangent T is drawn by connecting both sides of the dimple 31. A measuring location Y on an inclined plane is a point at which a perpendicular line intersects with the inclined plane of the dimple, wherein the perpendicular line is drawn from a midpoint of a straight line connecting the bottom De of the dimple and the edge Ed downward to the dimple 31. A measuring location X on a land is a midpoint between edges of adjacent dimples. It is noted that in the case that adjacent dimples contact each other so that no land exists, or in the case that the land is so narrow that the thickness is hard to be measured, the bottom, edge or inclined plane of the dimple is adopted as the measuring point.

In the measurement, test samples of six balls from three locations, i.e. the dimple where the pole P exists, the dimple near the equator E and the dimple near the shoulder S, were firstly prepared. Next, regarding each test piece (dimple), the thickness of the paint film at the bottom De, edge Ed, inclined plane Y and land X of the dimple was measured. Finally, measuring values of six balls were averaged, and the obtained average value was adopted as the thickness of the paint film.

(5) Sliding Angle

The sliding angles of the golf ball surface and sheet having the paint film formed thereon were measured.

A measuring sample sheet was prepared by forming the paint film on a slab formed from the cover composition. Specifically, pellets of the cover composition were fully filled into a mold having a thickness of 2 mm, and compression molded at 170° C. for 5 minutes. After being cooled, the slab was ejected from the mold. The surface of the slab was treated with sandblast. After that, a spray coating method using an air gun was used to apply the paint such that the dried paint film had a desired thickness.

The sliding angle was measured with a sliding contact angle meter (DMo-501SA available from Kyowa Interface Science, Inc.). The measuring conditions were as follows. In the measurement for the golf ball, water was dripped at the center of the dimple having a maximum diameter.

Measuring Method: Sliding Method
Analysis method: curve fitting method (section: 60 dots)
Field of view: WIDE1
Water amount: 19±1 μL (needle being used: stainless steel needle 15G)
Sliding condition: 0 to 90° (2.0° per second, continuous tilting)
Sliding and moving decision distance: tilt angle when moving at least 3 dots In addition, the adhesion energy (mJ/m$^2$) was calculated from the measuring values of the golf ball, using the following formula. It is noted that r is a contact radius, w is a droplet mass, g is gravitational acceleration, and a is a sliding angle.

$$\text{Adhesion energy} = (w \times g \times \sin \alpha)/(2 \times \pi \times r)$$

(6) Loss Tangent (Tan δ)

The storage modulus E' (Pa), loss modulus E" (Pa) and loss tangent (tan δ) of the paint film were measured under the following conditions.

Apparatus: Dynamic viscoelasticity measuring apparatus (Rheogel-E4000 available from UBM CO., Ltd.)
Test sample: A paint obtained by blending the polyisocyanate composition and the polyol composition was dried and cured at the temperature of 40° C. for 4 hours to prepare a paint film having a thickness ranging from 0.11 mm to 0.14 mm. The paint film was cut to prepare a test piece having a width of 4 mm and a distance between the clamps of 20 mm.
Measuring mode: tensile mode
Measuring temperature: −100° C. to 150° C.
Temperature increase rate: 4° C./min
Measuring date capturing interval: 4° C.
Oscillation frequency: 10 Hz
Measuring strain: 0.1%

(7) 10% Elastic Modulus of Paint Film

The tensile properties of the paint film were measured according to JIS K7161 (2014). Specifically, the polyisocyanate composition and the polyol composition were blended to prepare a paint, and the obtained paint was dried and cured at the temperature of 40° C. for 4 hours to prepare a paint film (thickness: 0.05 mm). The paint film was punched into the test piece type II (width of parallel part: 10 mm, gauge length: 50 mm) prescribed in JIS K7127 (1999), to prepare a test piece. The tensile test of the test piece was conducted with a precision universal tester (Autograph (registered trademark) available from Shimadzu Corporation) under testing conditions of a length between grips: 100 mm, a tensile speed: 50 mm/min and a testing temperature: 23° C., and the tensile stress at 10% strain (10% elastic modulus) was recorded.

(8) Dynamic Friction Coefficient

The dynamic friction coefficient of the golf ball was measured under the following conditions. It is noted that in the following conditions, the load is small and the moving speed is low, thus the dynamic friction coefficient of the outermost paint film layer can be measured.

Tester: Tribo Master TL201TS (available from Trinity-Lab Inc.)
Test sample: golf ball
Face plate: A plate made of stainless steel (HT1770 (size: 50 mm×150 mm×thickness 2 mm) available from Nippon Steel Nisshin Co., Ltd.) and having a face surface with an arithmetic mean roughness Ra of 2.9 μm and a maximum height mean value Ry of 21.7 μm was used.
Preparation method of face plate: The face plate was obtained by performing an air-blast treatment to the stainless steel. As the grinding material, a mixture of alumina powder (#60) and steel ball (ES300 available from Ervin industries Co., Ltd.) in a mixing ratio of 1:1 was used. The blasting conditions were: a distance of 10 cm between the face plate and the nozzle, and a pressure of 4 to 6 kg/cm² just before the nozzle.

Measuring method of Ra and Ry: Ra and Ry were measured with a surface roughness tester (SJ-301 available from Mitutoyo Corporation) by a method based on JIS B 0601-1994. Ra, Ry were each an average value of the values obtained at six measuring points. In addition, the cutoff value λc was 2.5 mm.

Temperature: 23° C.

Ball moving speed: 2 mm/s

Load: 1.96 N (200 gf)

Measurement method: The ball was fixed with a chuck, and allowed to move at a predetermined speed on a flat plate in a state that 200 gf of a load was applied on the ball, to measure the dynamic friction force.

Measuring item: dynamic friction (average value in the section of from 2-10 mm)

(9) Spin Rate Under a Dry Condition and Spin Rate Under a Wet Condition

A sand wedge (trade name: "CG 15 forged wedge", loft angel: 58°, available from Cleveland Golf Inc.) was installed on a swing machine available from Golf Laboratories, Inc. The golf ball was hit at a head speed of 16 m/s, and the spin rate (rpm) thereof was measured by continuously taking a sequence of photographs of the hit golf ball. The measurement was conducted ten times for each golf ball, and the average value thereof was adopted as the spin rate. The spin rate under the wet condition was measured when the club face and the golf ball were in a state of being wet with water. It is noted that the spin rate of the golf ball No. 10 was defined as 100, and the spin performance of each golf ball was represented by converting the spin rate of each golf ball into this index.

(10) Spin Rate Under a Condition that there is Grass Between the Golf Ball and the Club Face A sand wedge (trade name: "CG 15 forged wedge", loft angel: 58°, available from Cleveland Golf Inc.) was installed on a swing machine available from Golf Laboratories, Inc. The golf ball was hit at a head speed of 16 m/s, and the spin rate (rpm) thereof was measured by continuously taking a sequence of photographs of the hit golf ball. It is noted that two leaves (length: about 3 cm) of a wild grass were attached to the golf ball that was the testing object, and the golf ball was hit such that there existed the wild grass between the club face and the golf ball. The measurement was conducted ten times for each golf ball, and the average value thereof was adopted as the spin rate. It is noted that the spin rate of the golf ball No. 10 was defined as 100, and the spin performance of each golf ball was represented by converting the spin rate of each golf ball into this index.

1. Production of Spherical Core

According to the formulation shown in Table 1, the rubber composition was kneaded, and heat-pressed at the temperature of 150° C. for 19 min. in upper and lower molds, each having a hemispherical cavity, to obtain a spherical core having a diameter of 39.7 mm. It is noted that the amount of barium sulfate was adjusted such that the ball had a mass of 45.6 g.

TABLE 1

| Spherical core | | |
| --- | --- | --- |
| Rubber composition formulation (parts by mass) | Polybutadiene rubber | 100 |
| | Zinc acrylate | 30.5 |
| | Zinc oxide | 10 |
| | Barium sulfate | Appropriate amount |
| | Bis(pentabromophenyl) disulfide | 0.3 |
| | Dicumyl peroxide | 0.7 |
| | Benzoic acid | 2 |
| Molding condition | Temperature (° C.) | 150 |
| | Time (min) | 19 |
| Core properties | Compression deformation amount (mm) | 3.3 |
| | Center hardness (Shore C) | 53 |
| | Surface hardness (Shore C) | 80 |
| | Hardness difference (Surface − center) (Shore C) | 27 |

Polybutadiene rubber "BR730 (high-cis polybutadiene)" available from JSR Corporation Zinc acrylate: "ZN-DA90S" available from Nihon Jyoryu Kogyo Co., Ltd.

Zinc oxide: "Ginrei R" available from Toho Zinc Co., Ltd.

Barium sulfate: "Barium Sulfate BD" available from Sakai Chemical Industry Co., Ltd.

Bis(pentabromophenyl)disulfide: available from Kawaguchi Chemical Industry Co., Ltd.

Dicumyl peroxide: "Percumyl (register trademark) D" available from NOF Corporation Benzoic acid: available from Emerald Kalama Chemical Co., Ltd.

2. Preparation of Intermediate Layer Composition and Cover Composition

According to the formulations shown in Tables 2 and 3, the materials were mixed with a twin-screw kneading extruder to prepare the intermediate layer composition and the cover composition in a pellet form. The extruding conditions were a screw diameter of 45 mm, a screw rotational speed of 200 rpm, and a screw L/D=35, and the mixture was heated to 160° C. to 230° C. at the die position of the extruder.

TABLE 2

| Intermediate layer composition | |
| --- | --- |
| Himilan AM7329 | 55 |
| Himilan 1555 | 45 |
| Barium sulfate | Appropriate amount |
| Titanium dioxide | 3 |
| Slab hardness (Shore D) | 62 |

Himilan (registered trademark) AM7329: zinc ion-neutralized ethylene-methacrylic acid copolymer ionomer resin available from Du Pont-Mitsui Polychemicals Co., Ltd.

Himilan 1555: sodium ion-neutralized ethylene-methacrylic acid copolymer ionomer resin available from Du Pont-Mitsui Polychemicals Co., Ltd.

TABLE 3

| Cover composition | |
| --- | --- |
| Elastollan NY80A | 100 |
| Titanium dioxide | 4 |
| Ultramarine blue | 0.04 |
| Slab hardness (Shore D) | 27 |

Elastollan NY80A: thermoplastic polyurethane elastomer available from BASF Japan Ltd.

3. Molding of Intermediate Layer

The intermediate layer composition obtained above was directly injection molded onto the spherical core obtained above to form the intermediate layer (thickness: 1.0 mm) covering the spherical core.

4. Production of Reinforcing Layer

A reinforcing layer composition (trade name "Polin (registered trademark) 750LE" available from Shinto Paint Co., Ltd.) having a two-component curing type epoxy resin as the base resin was prepared. The base agent contains a bisphenol A type solid epoxy resin in an amount of 30 parts by mass, and a solvent in an amount of 70 parts by mass. The curing agent contains a modified polyamide amine in an amount of 40 parts by mass, titanium dioxide in an amount of 5 parts by mass, and a solvent in an amount of 55 parts by mass. The mass ratio of the base agent to the curing agent was 1/1. The reinforcing layer composition was applied to the surface of the intermediate layer with an air gun, and kept for 12 hours in an atmosphere of 23° C., to form the reinforcing layer. The thickness of the reinforcing layer was 7 μm.

5. Molding of Cover

The cover composition in the pellet form was charged into each of the depressed part of the lower mold for molding half shells, and a pressure was applied to mold half shells. The spherical body having the reinforcing layer formed thereon was concentrically covered with two of the half shells. The spherical body and the half shells were charged into a final mold provided with a plurality of pimples on the cavity surface. The cover (thickness: 0.5 mm) was formed by compression molding to obtain golf ball bodies. A plurality of dimples having an inverted shape of the pimples were formed on the cover.

6. Preparation of Paint

Preparation of Polyol Compositions No. 1 to 3 (Polyrotaxane Composition)

According to Tables 4 and 5, as the resin component, a polyrotaxane ("SeRM (registered trademark) super polymer SH3400P (a polyrotaxane having a cyclodextrin, at least a part of hydroxyl groups thereof being modified with a caprolactone chain via a —O—$C_3H_6$—O— group, a linear molecule being polyethylene glycol, and a blocking group being an adamantyl group; molecular weight of linear molecule: 35,000, hydroxyl value: 72 mg KOH/g, total molecular weight of polyrotaxane: 700,000 in weight average molecular weight)" available from Advanced Softmaterials Inc.), a polycaprolactone polyol ("Placcel (registered trademark) 308" (hydroxyl value: 190 to 200 mgKOH/g) available from Daicel Chemical Industries, Ltd.), and a vinyl chloride-vinyl acetate-vinyl alcohol copolymer ("Solbin (registered trademark) AL (hydroxyl value: 63.4 mg KOH/g)" available from Nissin Chemical Industry Co., Ltd.), were weighed. In 100 parts by mass of the resin component, 0.01 part by mass of dibutyltin dilaurate and 100 parts by mass of a solvent (a mixed solvent of xylene/methylethyl ketone=70130 (mass ratio)) were mixed, to prepare the polyol compositions No. 1 to 3. In the case that the filler was added, the filler was added in the polyol composition in an amount of 100 parts by mass relative to 100 parts by mass of the base resin constituting the paint film.

TABLE 4

| | | | Golf ball No. | | | | | | |
|---|---|---|---|---|---|---|---|---|---|
| | | | 1 | 2 | 3 | 4 | 5 | 6 | 7 |
| Paint | Polyol composition (parts by mass) | No. | 1 | 2 | 3 | 3 | 3 | 3 | 3 |
| | | Urethane polyol | — | — | — | — | — | — | — |
| | | Polyrotaxane | 36 | 70 | 50 | 50 | 50 | 50 | 50 |
| | | Polycaprolactone polyol | 35 | 17 | 28 | 28 | 28 | 28 | 28 |
| | | Vinyl chloride-vinyl acetate-vinyl alcohol copolymer | 29 | 13 | 22 | 22 | 22 | 22 | 22 |
| | Polyisocyanate composition (parts by mass) | No. | 1 | 1 | 1 | 1 | 2 | 1 | 3 |
| | | Adduct-modified product of HDI | 100 | 100 | 100 | 100 | 50 | 100 | 70 |
| | | Biuret-modfied product of HDI | — | — | — | — | — | — | — |
| | | Isocyanurate-modified product of HDI | — | — | — | — | 50 | — | — |
| | | Isocyanurate-modified product of IPDI | — | — | — | — | — | — | 30 |
| | Mixing ratio (NCO/OH molar ratio) | | 1.2/1.0 | 1.2/1.0 | 1.2/1.0 | 1.2/1/0 | 1.2/1.0 | 1.4/1.0 | 1.2/1.0 |
| | Filler | Type | Zeolite | Zeolite | Zeolite | Diatomite | Zeolite | Zeolite | Zeolite |
| | | Character | Porous | Porous | Porous | Porous | Porous | Porous | Porous |
| | | Amount of $SiO_2$ (mass %) | 69-70 | 69-70 | 69-70 | 80 | 69-70 | 69-70 | 69-70 |
| | | Mixing amount (relative to base resin) | 100 | 100 | 100 | 100 | 100 | 100 | 100 |
| Paint film | Thickness (μm) | | 10 | 10 | 10 | 10 | 10 | 10 | 10 |
| | Property of paint Ball | Sliding angle (sheet 20 μl) | 44 | 43 | 44 | 44 | 44 | 43 | 43 |
| | | Sliding angle (ball: 20 μl) | 38 | 40 | 38 | 38 | 38 | 40 | 40 |
| | | Adhesion energy (mJ/m$^2$) | 8 | 8 | 8 | 8 | 8 | 8 | 8 |
| | | Peak temperature of loss tangent (tansδ) (° C.) | −3 | 0 | −3 | −3 | 1 | −4 | 49 |
| | | 10% Elastic modulus (kgf/cm$^2$) | 21 | 20 | 21 | 20 | 29 | 18 | 30 |
| | | Dynamic friction coefficient of outermost layer of paint film | 0.92 | 0.91 | 0.873 | 0.873 | 0.83 | 0.89 | 0.72 |
| Golf ball index evaluation | Spin rate under a dry condition (rpm) | | 101 | 99 | 100 | 100 | 100 | 100 | 101 |
| | Spin rate under a condition that there is grass between the golf ball and the club face (rpm) | | 123 | 127 | 123 | 123 | 122 | 125 | 107 |
| | Spin rate under a wet condition (16 m/s * 58°) | | 118 | 118 | 118 | 114 | 123 | 114 | 132 |

| | | | Golf ball No. | | | | | | |
|---|---|---|---|---|---|---|---|---|---|
| | | | 8 | 9 | 10 | 11 | 12 | 13 | 14 |
| Paint | Polyol composition (parts by mass) | No. | 3 | 3 | 4 | 4 | 4 | 4 | 4 |
| | | Urethane polyol | — | — | 100 | 100 | 100 | 100 | 100 |
| | | Polyrotaxane | 50 | 50 | — | — | — | — | — |
| | | Polycaprolactone polyol | 28 | 28 | — | — | — | — | — |
| | | Vinyl chloride-vinyl acetate-vinyl alcohol copolymer | 22 | 22 | — | — | — | — | — |

TABLE 4-continued

| | | | | | | | | | |
|---|---|---|---|---|---|---|---|---|---|
| | Polyisocyanate composition (parts by mass) | No. | 1 | 4 | 5 | 1 | 5 | 5 | 1 |
| | | Adduct-modified product of HDI | 100 | — | — | 100 | — | — | 100 |
| | | Biuret-modified product of HDI | — | — | 30 | — | 30 | 30 | — |
| | | Isocyanurate-modified product of HDI | — | 70 | 30 | — | 30 | 30 | — |
| | | Isocyanurate-modified product of IPDI | — | 30 | 40 | — | 40 | 40 | — |
| | Mixing ratio (NCO/OH molar ratio) | | 1.2/1.0 | 1.2/1.0 | 0.38/1.0 | 1.2/1.0 | 0.61/1.0 | 1.2/1.0 | 1.2/1.0 |
| | Filler | Type | Talc | — | — | Talc | — | — | — |
| | | Character | Non-porous | — | — | Non-porous | — | — | — |
| | | Amount of $SiO_2$ (mass %) | — | — | — | — | — | — | — |
| | | Mixing amount (relative to base resin) | 100 | — | — | 100 | — | — | — |
| Paint film | Thickness (μm) | | 10 | 10 | 10 | 15 | 15 | 15 | 15 |
| Property of paint Ball | Sliding angle (sheet: 20 μl) | | 50 | 62 | 57 | 50 | 56 | 49 | 55 |
| | Sliding angle (ball: 20 μl) | | 46 | 60 | 61 | 51 | 59 | 45 | 52 |
| | Adhesion energy ($mJ/m^2$) | | 9 | 13 | 13 | 9 | 12 | 9 | 9 |
| | Peak temperature of loss tangent (tanδ) (° C.) | | −2 | 48 | 52 | 10 | 68 | 84 | 8 |
| | 10% Elastic modulus ($kgf/cm^2$) | | 22 | 20 | 10 | 21 | 65 | 180 | 20 |
| | Dynamic friction coefficient of outermost layer of paint film | | 0.9 | 0.72 | 0.62 | 0.8 | 0.57 | 0.62 | 0.98 |
| Golf ball index evaluation | Spin rate under a dry condition (rpm) | | 101 | 101 | 100 | 99 | 101 | 99 | 99 |
| | Spin rate under a condition that there is grass between the golf ball and the club face (rpm) | | 120 | 107 | 100 | 123 | 93 | 87 | 123 |
| | Spin rate under a wet condition (16 m/s * 58°) | | 84 | 100 | 100 | 100 | 109 | 118 | 91 |

Diatomite: Diatomaceous earth

TABLE 5

| | | | Golf ball No. | | | | |
|---|---|---|---|---|---|---|---|
| | | | 15 | 16 | 17 | 18 | 19 |
| Paint | Polyol composition (parts by mass) | No. | 3 | 3 | 3 | 3 | 3 |
| | | Urethane polyol | — | — | — | — | — |
| | | Polyrotaxane | 50 | 50 | 50 | 50 | 50 |
| | | Polycaprolactone polyol | 28 | 28 | 28 | 28 | 28 |
| | | Vinyl chloride-vinyl acetate-vinyl alcohol copolymer | 22 | 22 | 22 | 22 | 22 |
| | Polyisocyanate composition (parts by mass) | No. | 4 | 6 | 4 | 7 | 2 |
| | | Adduct-modified product of HDI | — | 30 | — | 30 | 50 |
| | | Biuret-modfied product of HDI | — | — | — | — | — |
| | | Isocyanurate-modified product of HDI | 70 | — | 70 | 70 | 50 |
| | | Isocyanurate-modified product of IPDI | 30 | 70 | 30 | — | — |
| | Mixing ratio (NCO/OH molar ratio) | | 1.2/1.0 | 1.2/1/0 | 1.2/1.0 | 1.2/1.0 | 1.2/1.0 |
| | Filler | Type | Zeolite | Zeolite | Zeolite | Zeolite | Zeolite |
| | | Character | Porous | Porous | Porous | Porous | Porous |
| | | Amount of $SiO_2$ (mass %) | 69-70 | 69-70 | 69-70 | 69-70 | 69-70 |
| | | Mixing amount (relative to base resin) | 10 | 10 | 30 | 30 | 50 |
| Paint film | Thickness (μm) | | 10 | 10 | 10 | 10 | 10 |
| Property of paint Ball | Sliding angle (sheet 20 μl) | | 44 | 43 | 42 | 42 | 41 |
| | Sliding angle (ball: 20 μl) | | 40 | 39 | 39 | 39 | 38 |
| | Adhesion energy ($mJ/m^2$) | | 8 | 8 | 8 | 8 | 8 |
| | Peak temperature of loss tangent (tansδ) (° C.) | | 28 | 44 | 44 | 12 | 12 |
| | 10% Elastic modulus ($kgf/cm^2$) | | 16 | 18 | 17 | 19 | 20 |
| | Dynamic friction coefficient of outermost layer of paint film | | 0.72 | 0.75 | 0.74 | 0.74 | 0.74 |
| Golf ball index evaluation | Spin rate under a dry condition (rpm) | | 101 | 101 | 101 | 100 | 101 |
| | Spin rate under a condition that there is grass between the golf ball and the club face (rpm) | | 110 | 113 | 117 | 117 | 117 |
| | Spin rate under a wet condition (16 m/s * 58°) | | 123 | 125 | 132 | 132 | 132 |

Preparation of Polyol Composition No. 4

Polytetramethylene ether glycol (PTMG) and trimethylolpropane (TMP) were dissolved as the first polyol component in a solvent (toluene and methylethyl ketone). Dibutyltin laurate was added as a catalyst into the above prepared solution in an amount of 0.1 mass % with respect to the total base materials. While keeping the temperature of the polyol solution at 80° C., isophorone diisocyanate (IPDI) was added dropwise as the first polyisocyanate component to the polyol solution and mixed. After finishing the addition of isophorone diisocyanate, stirring was continued until the isocyanate group disappeared. Then, the reaction liquid was cooled to the room temperature to prepare the urethane polyol (solid component content: 30 mass %). The formulation and the like of the obtained urethane polyol are shown in Table 6. In the case that the filler was added, the filler was added in the polyol composition in an amount of 100 parts by mass relative to 100 parts by mass of the base resin constituting the paint film.

TABLE 6

Urethane polyol

| Component | First polyol component | PTMG |
| --- | --- | --- |
| | | TMP |
| | First polyisocyanate component | IPDI |
| Number average molecular weight of PTMG | | 650 |
| TMP:PTMG (molar ratio) | | 1.87:1 |
| Molar ratio (NCO/OH) of NCO group of polyisocyanate component to OH group of polyol component | | 0.6 |
| Amount of PTMG (mass %) | | 46.2 |
| Hydroxyl value of solid component (mgKOH/g) | | 128.0 |
| Weight average molecular weight | | 7200 |

Polyisocyanate Composition

The following polyisocyanates were used to prepare the polyisocyanate compositions No. 1 to No. 7 according to the formulations shown in Tables 4 and 5.

Adduct-modified product of HDI: adduct-modified product of hexamethylene diisocyanate (Duranate (registered trademark) E402-80B (NCO amount: 7.3%) available from Asahi Kasei Chemicals Corporation)

Biuret-modified product of HDI: biuret-modified product of hexamethylene diisocyanate (Duranate (registered trademark) 21S-75E (NCO amount 15.5%) available from Asahi Kasei Chemicals Corporation)

Isocyanurate-modified product of HDI: isocyanurate-modified product of hexamethylene diisocyanate (Duranate TKA-100 (NCO amount: 21.7%) available from Asahi Kasei Chemicals Corporation)

Isocyanurate-modified product of IPDI: isocyanurate-modified product of isophorone diisocyanate (VESTANAT (registered trademark) T1890 (NCO amount: 12.0%) available from Degussa Co., Ltd.)

6. Formation of Paint Film

The polyol composition and the polyisocyanate composition were mixed according to the formulation shown in Tables 4 and 5 to prepare the paint compositions. The surface of the golf ball bodies obtained above was treated with sandblast and marked. The paint was applied with a spray gun, and dried for 24 hours in an oven at the temperature of 40° C. to obtain golf balls having a diameter of 42.7 mm and a mass of 45.6 g.

Filler

Diatomaceous earth: "Radiolite F" (volume average particle size: 7 μm, bulk density: 0.40 g/cm$^3$) available from Showa Chemical Industry Co., Ltd.

Zeolite: "Molecular sieve 13× POWDER" (volume median size: 8.7 μm, bulk density: 0.5 g/cm$^3$) available from Union Showa K.K.

Talc: "P8" (volume average particle size: 3.3 μm, bulk density: 0.12 g/cm$^3$) available from Nippon Talc Co., Ltd.

The application of the paint was conducted as follows. The golf ball body was placed in a rotating member provided with a prong, and the rotating member was allowed to rotate at 300 rpm. The application of the paint was conducted by spacing a spray distance (7 cm) between the air gun and the golf ball body, and moving the air gun in an up and down direction. The painting interval in the overpainting operation was set to 1.0 second. The application of the paint was conducted under the spraying conditions of overpainting operation: twice, spraying air pressure: 0.15 MPa, compressed air tank pressure: 0.10 MPa, painting time per one application: one second, atmosphere temperature: 20° C. to 27° C., and atmosphere humidity: 65% or less. Evaluation results regarding the spin performance of the obtained golf balls are shown in Tables 4 and 5.

It is apparent from Tables 4 and 5 that the golf ball according to the present invention wherein an outermost layer of the paint film located at the outermost layer of the golf ball contains a base resin and a porous filler, the base resin contains a polyurethane obtained by a reaction between a polyisocyanate composition and a polyol composition, and the porous filler contains SiO$_2$ in an amount of 50 mass % or more as a constituent component, has excellent spin performance on approach shots under a wet condition and excellent spin performance on approach shots under a condition that there is grass between the golf ball and the club face.

This application is based on Japanese patent application No. 2019-060595 filed on Mar. 27, 2019 and Japanese patent application No. 2019-192019 filed on Oct. 21, 2019, the contents of which are hereby incorporated by reference.

The invention claimed is:

1. A golf ball comprising a golf ball body and a paint film composed of at least one layer and formed on a surface of the golf ball body, wherein
an outermost layer of the paint film located at the outermost layer of the golf ball contains a base resin and a porous filler,
the base resin contains a polyurethane obtained by a reaction between a polyisocyanate composition and a polyol composition, and
the porous filler contains SiO$_2$ in an amount of 50 mass % or more as a constituent component, and has a bulk density of from 0.2 g/cm$^3$ to 1.0 g/cm$^3$.

2. The golf ball according to claim 1, wherein the polyol composition contains a polyrotaxane as a polyol component, the polyrotaxane has a cyclodextrin, a linear molecule piercing through the cyclic structure of the cyclodextrin, and blocking groups located at both terminals of the linear molecule to prevent disassociation of the cyclodextrin, and at least a part of hydroxyl groups of the cyclodextrin is modified with a caprolactone chain via a —O—C$_3$H$_6$—O— group, and an amount of the polyrotaxane in the polyol component is 30 mass % or more.

3. The golf ball according to claim 1, wherein the polyisocyanate composition contains an adduct-modified product of hexamethylene diisocyanate as a polyisocyanate component in an amount of 10 mass % or more in the polyisocyanate component.

4. The golf ball according to claim 1, wherein the polyisocyanate composition contains an adduct-modified product of hexamethylene diisocyanate and an isocyanurate-modified product of hexamethylene diisocyanate as a polyisocyanate component.

5. The golf ball according to claim 1, wherein the polyisocyanate composition contains an adduct-modified product of hexamethylene diisocyanate and an isocyanurate-modified product of isophorone diisocyanate as a polyisocyanate component.

6. The golf ball according to claim 1, wherein the polyisocyanate composition contains an isocyanurate-modified product of hexamethylene diisocyanate and an isocyanurate-modified product of isophorone diisocyanate as a polyisocyanate component.

7. The golf ball according to claim 1, wherein an amount of the porous filler is 3 parts by mass or more with respect to 100 parts by mass of the base resin.

8. The golf ball according to claim 1, wherein the porous filler contains $SiO_2$ in an amount of 60 mass % or more as the constituent component.

9. The golf ball according to claim 1, wherein a surface of the outermost layer of the paint film has a water sliding angle of less than 50°.

10. The golf ball according to claim 1, wherein a surface of the outermost layer of the paint film has an adhesion energy of less than 10 mJ/m².

11. The golf ball according to claim 1, wherein the outermost layer of the paint film has a dynamic friction coefficient of from 0.65 to 1.3 measured with a dynamic friction tester under following conditions:
   <measurement conditions>
   moving speed: 2 mm/s
   load: 1.96 N
   measuring item: dynamic friction average value in a moving distance of from 2 mm to 10 mm.

12. The golf ball according to claim 11, wherein the outermost layer of the paint film has the dynamic friction coefficient of from 0.68 to 1.2.

13. The golf ball according to claim 1, wherein the porous filler is at least one member selected from the group consisting of diatomaceous earth, zeolite and perlite.

14. The golf ball according to claim 1, wherein the porous filler has a volume average particle size of from 0.5 μm to 30 μm.

15. The golf ball according to claim 7, wherein the amount of the porous filler is 3 parts by mass or more and 200 parts by mass or less with respect to 100 parts by mass of the base resin.

16. The golf ball according to claim 1, wherein the polyol composition contains a urethane polyol as a polyol component, and the urethane polyol includes a polyether diol having a number average molecular weight in a range of from 600 to 3000 as a constituent component.

17. The golf ball according to claim 16, wherein the polyisocyanate composition contains a biuret-modified product of hexamethylene diisocyanate, an isocyanurate-modified product of hexamethylene diisocyanate and an isocyanurate-modified product of isophorone diisocyanate, and a mass ratio (biuret-modified product/isocyanurate-modified product) of the biuret-modified product of hexamethylene diisocyanate to the isocyanurate-modified product of hexamethylene diisocyanate ranges from 20/40 to 40/20.

18. The golf ball according to claim 2, wherein the polyol composition further contains a polycaprolactone polyol and/or a hydroxyl group modified vinyl chloride-vinyl acetate copolymer as a polyol component.

19. The golf ball according to claim 18, wherein a mass ratio (polycaprolactone polyol/polyrotaxane) of the polycaprolactone polyol to the polyrotaxane ranges from 0/100 to 90/10, and an amount of the hydroxyl group modified vinyl chloride-vinyl acetate copolymer in the polyol component contained in the polyol composition ranges from 4 mass % to 50 mass %.

20. The golf ball according to claim 2, wherein the polyisocyanate composition contains at least one member selected from the group consisting of an adduct-modified product of hexamethylene diisocyanate, an isocyanurate-modified product of hexamethylene diisocyanate, and an isocyanurate-modified product of isophorone diisocyanate.

* * * * *